(12) United States Patent
Konetski et al.

(10) Patent No.: US 10,846,408 B2
(45) Date of Patent: Nov. 24, 2020

(54) REMOTE INTEGRITY ASSURANCE OF A SECURED VIRTUAL ENVIRONMENT

(71) Applicant: Dell Products, L.P., Round Rock, TX (US)

(72) Inventors: David Konetski, Austin, TX (US); Carlton A. Andrews, Austin, TX (US); Ricardo L. Martinez, Leander, TX (US); Abeye Teshome, Austin, TX (US); Joseph Kozlowski, Hutto, TX (US); Charles D. Robison, Buford, GA (US); Girish S. Dhoble, Austin, TX (US); Andrew T. Fausak, Coppell, TX (US)

(73) Assignee: Dell Products, L.P., Round Rock, TX (US)

( * ) Notice: Subject to any disclaimer, the term of this patent is extended or adjusted under 35 U.S.C. 154(b) by 268 days.

(21) Appl. No.: 15/962,520

(22) Filed: Apr. 25, 2018

(65) Prior Publication Data

US 2019/0332773 A1    Oct. 31, 2019

(51) Int. Cl.
| | |
|---|---|
| H04L 29/06 | (2006.01) |
| G06F 21/57 | (2013.01) |
| H04L 12/24 | (2006.01) |
| G06F 9/455 | (2018.01) |
| H04L 9/32 | (2006.01) |

(52) U.S. Cl.
CPC .......... *G06F 21/57* (2013.01); *G06F 9/45558* (2013.01); *H04L 9/3247* (2013.01); *H04L 41/0806* (2013.01); *H04L 63/18* (2013.01); *H04L 63/20* (2013.01); *G06F 2009/45562* (2013.01); *G06F 2009/45587* (2013.01); *G06F 2009/45595* (2013.01)

(58) Field of Classification Search
CPC ..... H04L 63/18; H04L 9/3239; H04L 63/126; H04L 41/0806; H04L 9/3247; H04L 2209/56; H04L 63/20; G06F 2009/45587; G06F 2009/45562; G06F 21/57; G06F 9/45558; G06F 2009/45595
See application file for complete search history.

(56) References Cited

U.S. PATENT DOCUMENTS

| | | | | |
|---|---|---|---|---|
| 8,468,591 | B2 * | 6/2013 | Silverstone | G06F 9/45558 |
| 9,674,183 | B2 * | 6/2017 | Dyer | H04L 63/20 |
| 2009/0049510 | A1 * | 2/2009 | Zhang | G06F 21/53 |
| | | | | 726/1 |

* cited by examiner

*Primary Examiner* — Baotran N To
(74) *Attorney, Agent, or Firm* — Fogarty LLP (57) ABSTRACT

A secured virtual environment provides access to enterprise data and may be configured remotely while isolated from the operating system of an Information Handling System (IHS). In secured booting of the IHS, references signatures are received via an out-of-band connection to the IHS. The reference signatures specify reference states for components of the IHS. Prior to launching a secured virtual environment, a trusted resource of the IHS, such as embedded controller isolated from the operating system, is queried for updated signatures specifying operating states of the component. The integrity of the IHS is validated based on comparisons of the respective reference signatures and updated signatures. If the integrity of the IHS is validated, a secured virtual environment is configured such that particular user may access the enterprise data according to applicable policies that may be periodically revalidated. The secured virtual environment may then be launched on the IHS.

20 Claims, 4 Drawing Sheets

REMOTE INTEGRITY ASSURANCE OF A SECURED VIRTUAL ENVIRONMENT

FIELD

This disclosure relates generally to Information Handling Systems (IHSs), and more specifically, to security for virtual environments utilized by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An enterprise may employ a wide variety of IHSs within an enterprise system. An enterprise system utilizes IHSs to provide employees with access to the tools and business data required to perform their job functions. An enterprise system is required to support employee productivity, while also placing paramount importance on protecting business data, both from loss and misuse. The difficulty of supporting employee productivity while protecting business data has been greatly compounded by the advent of the modern workplace settings in which employees may expect to access business data from a variety of different locations and are not restricted to the use of a single IHS.

One of the difficulties in securing a modern enterprise system is detecting and mitigating the effects of an employee accessing business data from an IHS that has been compromised. Malicious software, such as computer viruses, may be surreptitiously or unintentionally installed on an IHS utilized by an employee. One tactic employed by such malicious software programs is to appropriate data that is stored by an IHS. Such data thefts may provide malicious actors with valuable financial information and information that may be used in identity thefts. Another tactic employed by malicious actors is the use ransomware that infects an IHS and encrypts data stored by the IHS. The malicious actor may then extort a ransom in order for the owner of the IHS to regain access to the encrypted data.

SUMMARY

In various embodiments, methods for remotely configuring a secured virtual environment on an Information Handling System (IHS) include: receiving one or more reference signatures, wherein each reference signature specifies a reference state for a component of the IHS; receiving a request to launch a secured virtual environment on the IHS for a first user; issuing a request for calculation of one or more updated signatures, wherein each updated signature specifies an operating state for the component of the IHS in operation; validating the integrity of the IHS based on comparisons of the reference signatures and the updated signatures for the respective components of the IHS; if the integrity of the IHS is validated, configuring a secured virtual environment for the first user according to the one or more policies; and permitting launching the secured virtual environment on the IHS.

In certain additional embodiments, the methods also include, during operation of the launched virtual environment on the IHS, periodically issuing additional requests for calculation of one or more further updated signatures and validating the integrity of the IHS based on comparisons of the reference signatures and the further updated signatures for the respective components of the IHS. In certain additional embodiments of the methods, the request for calculation of updated signatures is issued to a trusted resource installed on the IHS. In certain additional embodiments of the methods, the trusted resource is an embedded controller installed on the IHS. In certain additional embodiments, the methods further include determining a reference signature for the configured virtual environment. In certain additional embodiments, the methods further include, during operation of the launched virtual environment, periodically determining an updated signature for the launched virtual environment and validating the integrity of the launched virtual environment by comparing the updated signature against the reference signature for the virtual environment. In certain additional embodiments, the methods further include collapsing the secured virtual environment on the IHS if the integrity of the virtual environment is not successfully validated.

In various embodiments, an Information Handling System (IHS) includes: one or more processors; a trusted resource configured to: calculate one or more reference signatures during booting of the IHS, wherein each reference signature specifies a reference state for a component of the IHS, transmit the one or more reference signatures to a remote attestation service, calculate one or more updated signatures, wherein each updated signature specifies an operating state for the respective component of the IHS in operation, and transmit the one or more updated signatures to the remote attestation service; and a system memory coupled to the one or more processors, the system memory including program instructions stored thereon that, upon execution by the one or more processors, cause the IHS to: initialize a trusted agent for hosting a plurality of secured virtual environments on the IHS; issue, by the trusted agent, a request for a first secured virtual environment on the IHS for a first user; receive, by the trusted agent, configuration information from the remote attestation service for launching the first secured virtual environment for the first user on the IHS, if the integrity of the IHS during booting has been validated by the remote attestation service based on the one or more reference signatures; and collapse, by the trusted agent, the first secured virtual environment on the IHS, if the integrity of the IHS in operation cannot be validated by the remote attestation service based on the one or more updated signatures.

In certain additional embodiments of the IHS, the integrity of the IHS in operation is validated by the remote attestation service based on comparisons of the reference signatures and the updated signatures for the respective components of the IHS. In certain additional embodiments of the IHS, the integrity of the IHS in operation is periodically validated by the remote attestation service. In certain additional embodiments of the IHS, the trusted resource calculates the one or more updated signatures based on a request issued by the remote attestation service. In certain additional embodiments of the IHS, the trusted resource is an embedded controller installed on the IHS. In certain additional embodiments of the IHS, the configuration information received from the remote attestation service comprises a first software package utilized by the trusted agent to launch the first secured virtual environment. In certain additional embodiments of the IHS, the configuration information received from the remote attestation service comprises a second software package utilized by the trusted agent to launch a second secured virtual environment that is hosted by the IHS concurrently with the first secured virtual environment.

In various embodiments, a system includes an Information Handling System (IHS) comprising a trusted resource configured to: calculate one or more reference signatures, wherein each reference signature specifies a reference state for a component of the IHS during booting; transmit the one or more reference signatures to a remote attestation service; calculate one or more updated signatures, wherein each updated signature specifies an operating state for the respective component of the IHS in operation; and transmit the one or more updated signatures to the remote attestation service; the IHS further comprising a trusted agent for hosting a plurality of secured virtual environments on the IHS, the trusted agent configured to: issue a request for a first secured virtual environment on the IHS for a first user; receive configuration information from the remote attestation service for launching the first secured virtual environment for the first user on the IHS; the remote attestation service configured to: validate the integrity of the IHS during booting based on the one or more reference signatures; transmit the configuration information to the trusted agent, if the integrity of the IHS during booting is validated; and periodically validate the integrity of the IHS in operation based on comparisons of the reference signatures and the updated signatures for the respective components of the IHS.

In certain additional embodiments of the system, the configuration information transmitted by the remote attestation agent comprises a first software package utilized by the trusted agent to launch the first secured virtual environment. In certain additional embodiments of the system, the configuration information transmitted by the remote attestation service comprises a second software package utilized by the trusted agent to launch a second secured virtual environment that is hosted by the IHS concurrently with the first secured virtual environment. In certain additional embodiments of the system, the remote attestation service is further configured to issue a command to the trusted agent to collapse the first virtual environment if the integrity of the IHS in operation is not successfully validated. In certain additional embodiments of the system, the remote attestation service is further configured to determine a reference signature for the first secured virtual environment and further configured to periodically request the trusted agent to calculate an updated signature for the first secured virtual environment in operation. In certain additional embodiments of the system, the remote attestation service is further configured to periodically validate the first secured virtual environment based on the reference signature for the first secured virtual environment and the updated signature calculated by the trusted agent.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
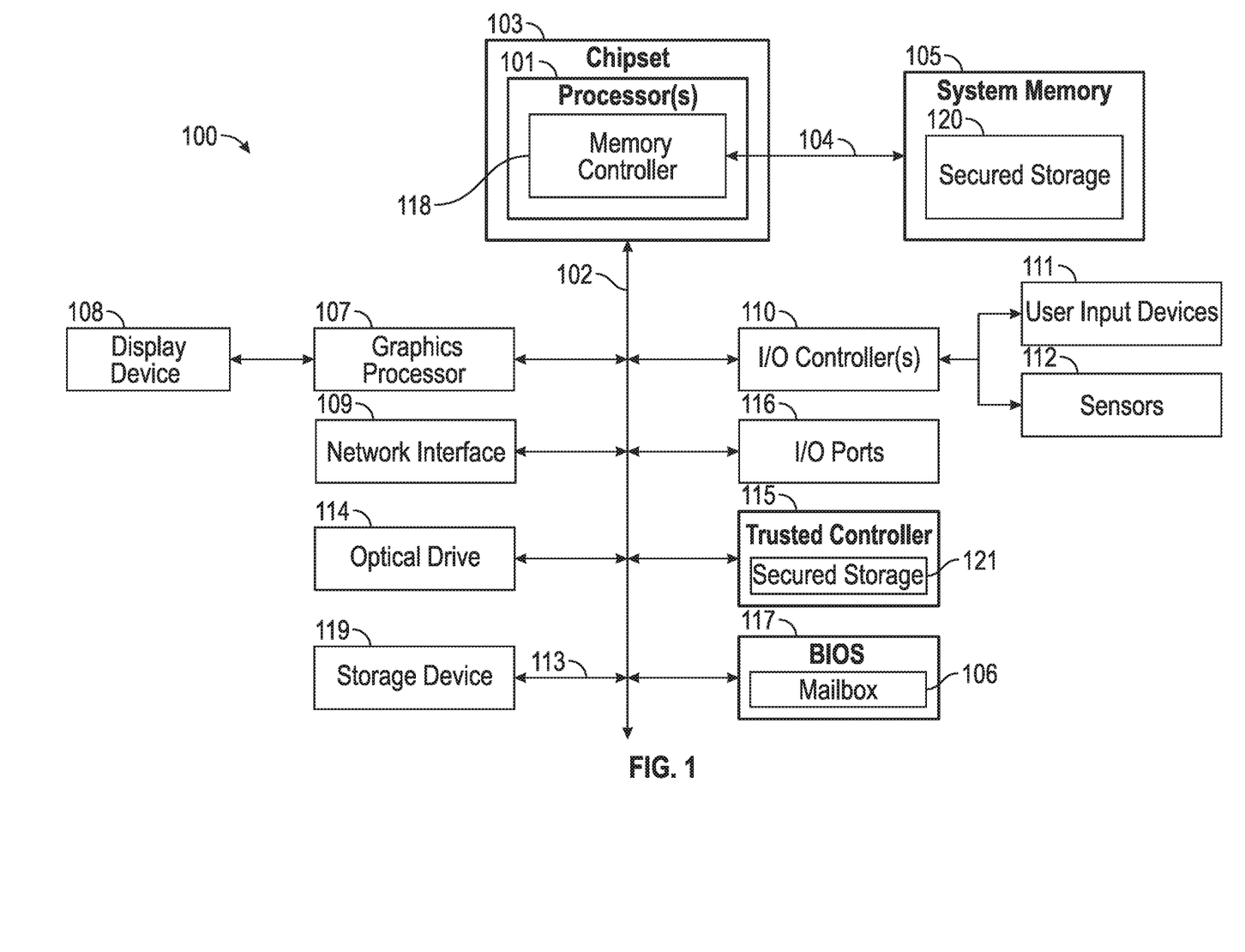
FIG. 1 is a block diagram depicting certain components of an IHS configured according to various embodiments to host a secured virtual environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 illustrates certain components of an IHS 100 configured according to certain embodiments to utilize a remotely-configured secured virtual environment, where the integrity of the IHS may be validated remotely before the virtual environment is launched on the IHS. The integrity of the IHS may be further validated remotely on an ongoing basis during the operation of the secured virtual environment. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also utilize the described secured virtual environments in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 includes a secured storage 120 that may be a portion of the system memory designated for storage of information, such as access policies and component reference signatures, for use in hosting a secured virtual environment that runs within the operating system of IHS 100. In such embodiments, a signature may be calculated based on the contents of the secured storage 120 and stored as a reference signature. The integrity of the data stored in the secured storage 120 may then be validated at a later time by recalculating this signature of the contents of the secured storage and comparing the recalculated signature against the reference signature.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, the network interface 109 may support connections between a trusted IHS component, such as trusted controller 115, and a remote attestation service 345, such as described with regard to FIG. 3. In such embodiments, a connection supported by the network interface 109 between the remote attestation service 345 and the trusted component may be considered an out-of-band (OOB) connection that is isolated from the operating system of the IHS.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiments, BIOS 117 includes a predefined memory or memory region that may be referred to as a NVM (Non-Volatile Memory) mailbox 106. In such embodiments, the mailbox 106 may provide a secured storage location for use in storing workspace access policies, reference signatures or other data utilized to host and validate a secured virtual environment on IHS 100. In certain embodiments, the BIOS mailbox 106 may be utilized as a secured storage utilized by a remote attestation service 345 in order to store access policies and signatures for use in validating the integrity of the IHS 100 and/or a secured workspace hosted by IHS 100. BIOS mailbox 106 and secured storage 120 in system memory 105 may be utilized in this manner instead of, or in conjunction with, integrity validations implemented by trusted controller 115.

In the illustrated embodiment, a trusted controller 115 is coupled to IHS 100. In certain embodiments, the trusted controller 115 is an embedded controller that is installed as a component of the motherboard of IHS 100. In certain embodiments, trusted controller 115 may be a Trusted Platform Module that is configured to verify the integrity of certain components of IHS 100 and to provide a secured storage 121 that may be utilized in hosting a secured virtual environment on IHS 100. For instance, trusted controller 115 may be configured to calculate signatures that uniquely identify individual components of IHS 100. Trusted controller 115 may calculate a hash value based on the configuration of a hardware component coupled to IHS 100. For instance, trusted controller 115 may calculate a hash value based on all firmware and other code or settings stored in an onboard memory of a hardware component, such as a network interface 109. Such a hash value may be maintained in the secured storage 121 as a reference signature. The trusted controller 115 may be further configured to recalculate a hash value at a later time for such a component. The hash value recalculated for the component may then be compared against the reference hash value signature in order to determine if any modifications have been made to a component, thus indicating the component has been compromised. In various embodiments, the trusted controller 115 may be used to validate the integrity of hardware and software components installed on IHS 100.

Figure 3:
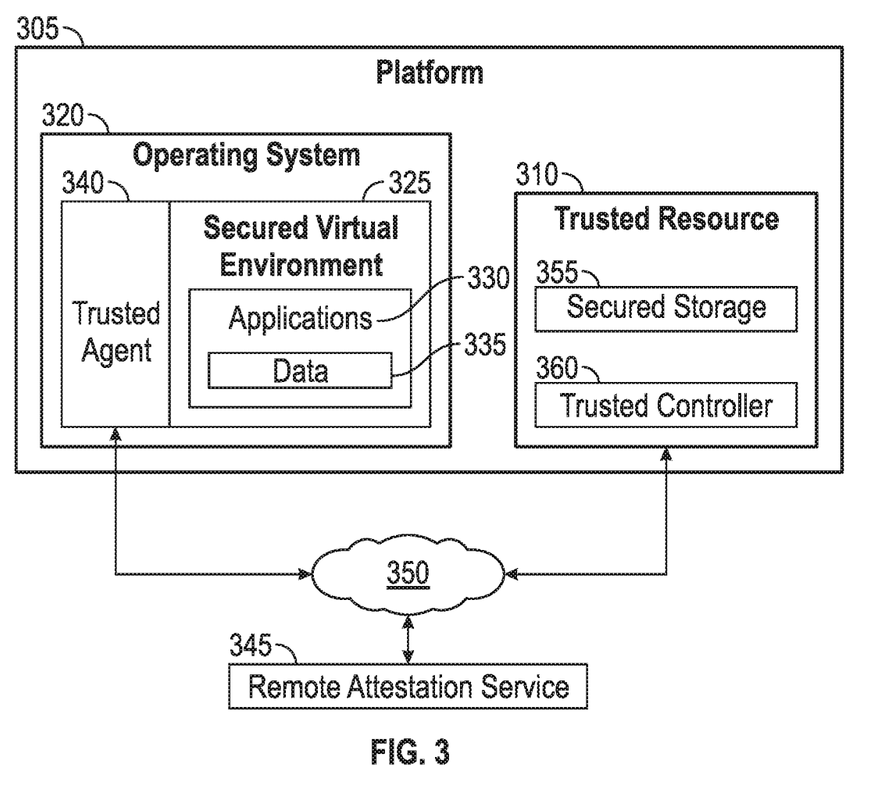
FIG. 3 is a block diagram depicting certain components of an additional system configured according to various embodiments to host a secured virtual environment.
Figure 4:
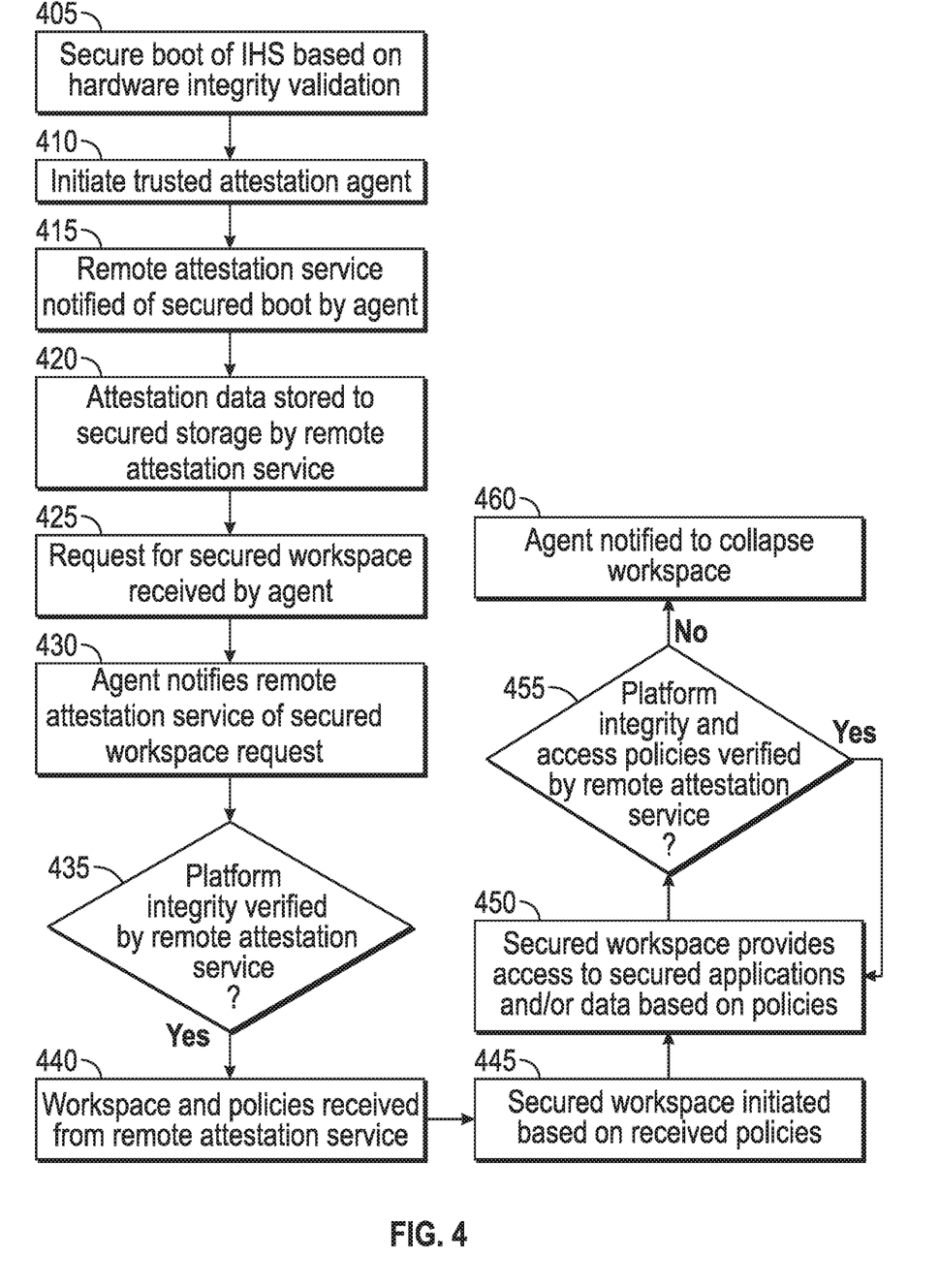
FIG. 4 is a flowchart diagram depicting certain steps of a process for hosting a secured virtual environment according to various embodiments.

As described in additional detail in regard to FIGS. 3-4, in certain embodiments, the trusted controller 115 may interoperate with a remote attestation service 345 in hosting a secured workspace on IHS 100. For instance, remote attestation service 345 may issue requests for the trusted controller 115 to calculate signatures for hardware and/or software components of the IHS 100 and to transmit the calculated signatures to the remote attestation service 345, where they may be stored and utilized to determine whether the IHS 100 has been compromised.

In various embodiments, an IHS 100 does not include all of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the processor 101 as systems-on-a-chip.

Figure 2:
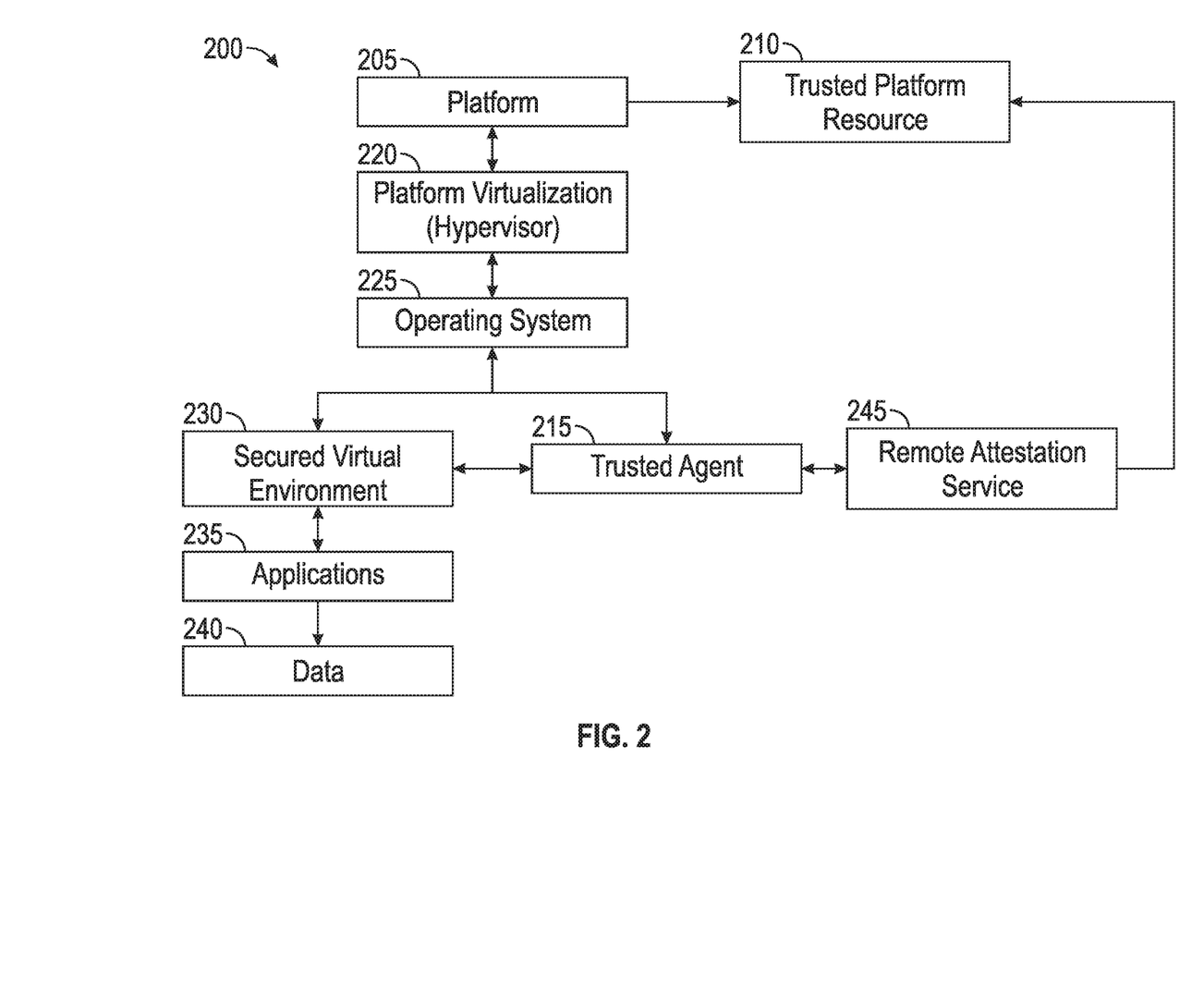
FIG. 2 is a block diagram depicting certain components of a system configured according to various embodiments to host a secured virtual environment.

FIG. 2 is block diagram illustrating certain components of a system 200 implementing a secured virtual environment 230 according to various embodiments. As illustrated, at one end of the system 200 is the platform 205 from which a user will be accessing the secured data 240 and/or a secured software application 235. In certain embodiments, the platform 205 may be implemented by the hardware, firmware and software of an IHS, such as IHS 100 described with respect to FIG. 1. Accordingly, platform 205 may be a personal computing device, such as a laptop, desktop, tablet, 2-in-1 convertible device, or a smart phone, capable of interfacing with an enterprise system and hosting a secured virtual environment 230. As described with regard to FIG. 1, an IHS may include one or more secured data storages. For example, the trusted platform resource 210 may be implemented as a secured storage 121 of a trusted controller 115 that operates independently of the operating system of the IHS 100. Also as described with respect to FIG. 1, an IHS 100 may implement one or more secured storages, such as a designated secured memory area of the system memory 105 or as a mailbox storage of BIOS 117. Referring back to FIG. 2, platform 205 similarly may include a trusted platform resource 210 that includes a secured storage and is independent of operating system 225.

In the embodiment of FIG. 2, platform 205 supports a platform virtualization layer 220, which may be referred to in certain scenarios as a hypervisor. The platform virtualization layer 220 allows multiple virtual machines to run concurrently on platform 205, where each virtual machine may host a different instantiated operating system 225. The hypervisor 220 provides a virtual machine container that presents a logical hardware interface to the operating system (s) 225 installed on platform 205. By utilizing a platform virtualization layer 220, multiple different operating systems 225 may run concurrently on a single platform 205, while isolating the operating system 225 from the hardware and firmware used to implement platform 205.

In certain scenarios, the system 200 of FIG. 2 may be a component of an enterprise computing system by which an enterprise may provide users with controlled access to secured data 240 via one or more software applications 235. In certain scenarios, one or more of the software applications 235 installed on platform 205 may be secured such that user are provided with controlled access to these software applications. In the illustrated embodiment, users are provided access to secured data 240 and/or secured software applications 235 via a secured virtual environment 230 provided within an operating system 225 installed on platform 205. The secured virtual environment 230 includes tools and resources necessary for a particular user to access secured data 240 and/or a secured application 235 according to policies that specify restrictions on the user's access. In this manner, an enterprise user may be provided with access to enterprise data and the tools necessary for user to perform job functions involving enterprise data or applications, thus promoting the user's productivity, while maintaining the secured data 240 and/or secured software application 235 protected within the secured virtual environment 230. In certain scenarios, the described virtual environment may be referred to as a workspace.

As described in additional detail with regard to the embodiments of FIGS. 3 and 4, the integrity of platform 205 and of the secured virtual environment 230 may be verified at the time the secured virtual environment 230 is launched, and may also be re-verified on an ongoing basis throughout the use of the secured virtual environment 230. In certain scenarios, the integrity of platform 205 may be verified retroactively, even if the secured virtual environment is being launched long after platform 205 has been booted. Also as described in addition detail below, the initial and ongoing verification of the integrity of the platform 205 and/or the secured virtual environment 230 may be implemented via a remote, trusted attestation service 245 that verifies the integrity of certain hardware and/or software components of platform 205, thus providing assurance that the platform 205 has not been compromised. The trusted attestation service 245 may verify the hardware integrity of platform 205 via out-of-band communications with the trusted platform resource 210 and secured communications with a trusted agent 215 operating on platform 205, thus protecting the enterprise data 240 without reliance on the installed operating system 225.

FIG. 3 depicts certain components of a system for hosting a secured virtual environment 325 on a platform 305, where the integrity of the platform 305 and the secured workspace environment 325 may be verified by a remote attestation service 345. As with the system of FIG. 2, platform 305 may correspond to an IHS such as IHS 100 described with regard to FIG. 1. Platform 305 may include a trusted resource 310 utilized by the remote attestation service 345 in securing the virtual environment 325 on platform 305. In certain embodiments, trusted resource 310 may be a trusted controller 360 configured to query various hardware and/or software components of the platform 305 in order to calculate signatures that describe a state of these components. For instance, a trusted controller 360 may calculate reference signatures for various hardware components of the platform 305 during secured booting of the platform and prior to initialization of the operating system 320 on the platform 305. In this manner, trusted controller 360 may capture signatures for components of the IHS independent of the operating system 320.

Prior to launching a secured virtual environment 325 on the platform 305, the integrity of the platform 305 may first be validated by the remote attestation service 345 based on the reference signatures calculated by trusted controller 360. In certain embodiments, the trusted resource 310 may be configured to notify the remote attestation service 345 of the secured booting of the platform 305 and to provide the reference signatures calculated by the trusted controller 360 during the secured booting of the platform 305. In such embodiments, the reference signatures transmitted to the remote attestation service may be utilized to validate the integrity of the platform upon booting.

In certain embodiments, the remote attestation service 345 may utilize secured storage 355 configured as a trusted resource 310 on platform 305 for the storage of the reference signatures. Storage of reference signatures back to secured storage of platform 305 in order to support validation of the integrity of platform 305 by other attestation services in addition to, or instead of remote attestation service 345. In certain embodiments, various additional signatures and policies may be stored to the secured storage 355 and similarly utilized by remote attestation service 345 and/or other attestation services. In certain embodiments, secured storage 355 may be a component of trusted controller 360.

As illustrated in FIG. 3, the trusted resource 310 communicates with the trusted attestation service 345 via a network 350, such as the Internet, via a separate communication pathway than utilized by the operating system 320 to communicate with the trusted attestation service 345. In this manner, the remote attestation service 345 utilizes out-of-band communications in validating the integrity of the platform 305, where these out-of-band communications are independent of operating system 320. In scenarios where the operating system 320 or applications running within operating system 320 have been compromised, the validation of the platform 305 by the remote attestation service 345 remains isolated from the compromised operating system 320.

Also illustrated in FIG. 3 is the trusted agent 340 that interfaces with the remote attestation service 345 in hosting s secured virtual environment 325 on platform 305. The trusted agent 340 may support multiple secured virtual environments concurrently on platform 305, where each secured virtual environment may remain isolated from the other secured virtual environments concurrently hosted by the trusted agent 340. In scenarios supporting multiple concurrent virtual environments, the integrity of each virtual environment may be separately verified. In addition, each virtual environment supported by the trusted agent 340 may provide the user with access to separate enterprise data 335 and applications 330, where access to the data and applications in each virtual environment is governed by separate policies.

In the illustrated embodiment, trusted agent 340 runs as a process within operating system 320. In order to safeguard trusted agent 340, and the secured virtual environment 325 supported by the trusted agent, the trusted agent 340 process may itself be validated on a periodic basis by the remote attestation service 345. In such embodiments, a reference signature may be calculated for trusted agent 340 prior to deployment on platform 305. The remote attestation service 345 may periodically calculate an updated signature of the trusted agent 340 in order to determine whether the agent itself has been compromised. The trusted agent 340 may be configured to communicate with the remote attestation service 245 via secured communications mechanisms that remain isolated from the operating system 320.

FIG. 4 illustrates certain steps of a process according to various embodiments for launching and running a secured virtual environment that utilizes a remote attestation service to validate the integrity of the underlying platform, and in some cases, to also validate the integrity of the secured virtual environment. In the illustrated embodiment, the process begins at step 405 with the secured boot of the IHS. In certain embodiments, the IHS may be similar in various respects to IHS 100 of FIG. 1, platform 205 of FIG. 2 and/or platform 305 of FIG. 3. As described with regard to FIG. 1, an IHS may utilize a trusted controller 115 for verifying the hardware integrity of the IHS immediately upon booting of the IHS and before initialization of the operating system. For instance, the trusted controller 115 may calculate a signature for certain hardware and software components of the IHS immediately upon booting, thus providing a reference signature for each of these components. In certain embodiments, these reference signatures may then be transmitted to a remote attestation service where reference signatures may be stored and used at a later time to validate the integrity of the IHS in operation.

With the hardware integrity of the IHS verified and the IHS securely booted, at step 410 the trusted attestation agent may be initialized on the IHS. The trusted attestation agent may be configured to communicate with the remote attestation service in order to host and validate a secured environment on the IHS. In certain embodiments, the trusted attestation agent may be used to periodically calculate signatures corresponding to an operating state of a secured workspace environment being hosted by the IHS. In certain embodiments, the trusted attestation agent may be a process of the booted operating system of the IHS. In other embodiments, the trusted attestation agent may run externally to the operating system, such as a process that runs on a trusted resource. For example, the trusted attestation agent may run as a process of trusted controller 115 of FIG. 1. Certain embodiments may be configured to implement periodic validations of the trusted attestation agent in order to verify the integrity of the attestation agent itself.

At step 415, the remote attestation service may be notified of the secured boot by the IHS. As described, in certain embodiments a trusted controller installed on the IHS may be configured to validate the integrity of the IHS immediately upon booting and prior to launching the operating system of the IHS. In such embodiments, the trusted controller may be configured to issue a notification to the remote attestation service, where the notification provides a unique identifier associated with the IHS. In certain embodiments, the trusted controller may be configured to transmit signatures calculated during the secured boot to the remote attestation service for use as reference signatures. In certain embodiments, the trusted attestation agent initialized at step 410 may also be configured to issue a notification of its initialization to the remote attestation service. In such scenarios, the remote attestation service may thus be notified both of secured booting of the IHS by a trusted platform resource, such as the trusted controller, and of the initialization of the trusted attestation agent, which may be an operating system process of the IHS.

In certain embodiments, at step 420, the signatures received by the remote attestation service, such as the reference signatures generated by a trusted controller, may be stored to a secured storage on the IHS. As described with regard to FIG. 1, an IHS may be configured with secured storage as a component of system memory, a BIOS and/or a trusted controller. In addition to, or instead of, storing signature data from an IHS remotely, the remote attestation agent may store all or some of the received signatures back to the secured storage of the IHS via an out-of-band connection, such as via a trusted controller.

At this point in the process in the embodiment of FIG. 4, the IHS has been securely booted and is operational, such that the operating system has been loaded and initialized by the IHS and certain default applications may also be initialized by the operating system. At step 425 a request for a secured workspace may be received. In certain embodiments, the request for a secured workspace may be automatically initiated as part of the default startup procedures implemented by the IHS. For instance, the IHS may be configured to launch a secured workspace as a default software application that is launched upon initialization of the operating system. In such scenarios, the secured workspace may be launched by default based on policies that are applicable to the user and/or the IHS. For instance, enterprise workspace policies may specify the default launch of a workspace for particular classifications of users that are supported by the enterprise system. Certain employees or groups of employees may require regular access to secured applications and data as part of their core job functions. Accordingly, upon booting of an IHS by such employees, a request for default workspace may be automatically initiated at step 425. In certain embodiments, a default workspace may be launched based on the specifications of the IHS being used by the individual. For instance, enterprise workspace policies may launch a default workspace for an individual booting a laptop, but may refrain from launching a default workspace when that same individual is booting a tablet or smartphone. In other embodiments, a request for a secured workspace may be received at step 425 via a request initiated by a user, such as via a user interface provided by the trusted attestation agent initiated at step 410.

Whether the secured workspace is being requested as part of a default configuration, or the secured workspace is being requested by a user, at step 430 the trusted attestation agent may notify the remote attestation service of the request. In certain scenarios, the request issued to the remote attestation service may include information that may be used for configuring the workspace, such as the unique identifier associated with the IHS and information identifying the user of the IHS. The identifying information may then be utilized by the remote attestation service to identify the applicable policies and configure a secured workspace accordingly.

Prior to launching a secured workspace on an IHS, at step 435, the remote attestation service validates the integrity of the IHS for which the request for a secured workspace has been received. As described, reference signatures may be calculated for certain components of the IHS, such as during secured booting of the IHS. Each of these reference signatures may be values that are calculated based on the hardware and/or software state of a component of the IHS at the time of the secured booting of the IHS. In certain embodiments such reference signatures may be calculated during manufacture and configuration of the IHS, where these reference signatures may be stored for use by the remote attestation service and/or stored to a secured storage of the IHS.

In order to verify the integrity of the IHS prior launching a secured workspace on the IHS, at step 435, the remote attestation service may query a trusted resource on the IHS to perform updated signature calculations for components of the IHS for which reference signatures are available. For instance, a trusted controller on the IHS may receive out-of-band requests from the remote attestation service to generate updated signatures for components of the IHS, now in operation. In such scenarios, the trusted controller may query the various components of the IHS to calculate updated signatures corresponding to their current operating states. The trusted controller may then transmit the updated signatures to the remote attestation service, again via an out-of-band communication, for comparison versus the reference signatures for the respective components. In this manner, the trusted attestation service may validate the integrity of the IHS and thus launches a workspace on a secured platform that can be verified as being uncompromised. As described, the security of the IHS may be validated retroactively to the secured booting of the IHS at step 405, even though the request for a secured workspace may be issued at step 425, well after booting of the IHS.

The integrity of the IHS is verified by the remote attestation service, at step 440 the information necessary to launch the secured workspace may be transmitted to the IHS by the remote attestation service. In certain embodiments, the secured workspace itself may be transmitted to the IHS as a software package that may be encrypted and signed by the remote attestation service. In certain embodiments, the remote attestation service may instead transmit configuration information to the IHS for loading, configuring and launching a secured workspace on the IHS. In certain embodiments, the configuration information may be used to generate a interface on the IHS allowing remote access to a secured workspace that runs as a remote application. In certain embodiments, the remote attestation service may also transmit policy information to the IHS, where these policies may specify rules and conditions applicable to the use of secured workspace to be launched on the IHS. In certain embodiments, such policies may be stored via an out-of-band connection to a secured storage on the IHS. These policies may be used to detect conditions that require modifications to the secured workspace, or collapsing the secured workspace.

At step 445, the secured workspace may then be launched on the IHS. As described, a secured workspace may be a virtual environment launched within the operating system of the IHS. In such embodiments, the secured workspace may be a software application comprised of one more processes running within the operating system of the IHS. In certain embodiments, the secured workspace may be a remote application that runs on a remote server(s), with only a graphical interface that runs locally on the IHS and allows the user to interact with the secured workspace running remotely. In other embodiments, the secured workspace may be launched within another application running in the operating system of the IHS, such as within a web browser. As described, a secured workspace may include resources, such as libraries, cryptographic tools and binaries, that are required for the use of secured applications and/or secured data within the secured workspace and support secured communications with the remote attestation service, in some scenarios via a trusted agent. Configured in this manner, the secured workspace protects enterprise data within a secured environment that is isolated from the operating system, while still providing the user with the resources necessary to perform job functions that require access to enterprise data.

With the secured workspace configured and launched, at step 450, the user may utilize secured applications and access secured data according to the policies that set forth restrictions applicable to the user and/or to the IHS hosting the secured workspace. At step 455, the integrity of the IHS may be periodically verified by the remote attestation service in order to ensure that the IHS hosting the secured workspace has not been compromised. As described, the remote attestation service may utilize a trusted resource on the IHS, such as a trusted controller 115, to calculate signatures for various components of the IHS. These signatures may be transmitted to the remote attestation service via an out-of-band connection, where they may be compared to the previously calculated reference signatures for each respective component, thus identifying any components that may have been compromised.

In certain embodiments, the integrity of the secured workspace itself may be similarly periodically validated at step 340. As described, the remote attestation service may configure and transmit a secured workspace environment to an IHS as a software package. In such embodiments, the remote attestation service may calculate a reference signature based on various files that comprise the software package, such as libraries, binaries and configuration files, prior to transmitting the secured workspace environment to the IHS. This reference signature may thus be compared against signatures that are periodically calculated at step 455 based on the secured workspace in operation. In this manner, the integrity of a secured workspace may be periodically confirmed by the remote attestation service in order to ensure that the secured workspace has not been compromised and the secured data remains within the isolated container provided by the secured workspace.

In certain embodiments, the access policies applicable to the user of the IHS may be similarly validated at step 455 by the remote attestation service. As described, policies may specify restrictions on the use of secured data and/or applications and may be maintained in a secured storage of the IHS in addition to or instead of remote storage by the remote attestation service. Such policies may be specific to an individual user of the enterprise system or may apply to categories of users. Access control policies may be altered for a variety of reasons. For instance, a user's access to secured data and/or applications may expire based on a configured timer. A user's access may also be changed to grant a user with access to additional secured data and/or applications. A user's access to a secured applications and/or data may be revoked based on indications of suspicious activity by a user or by the IHS hosting the secured workspace. At step 455, any such changes to the access policies maintained in the secured storage may be detected by the remote attestation service.

As illustrated, if the integrity of the IHS and/or secured workspace is confirmed at step 455, the user may continue use of the secured data and/or secured applications within the secured workspace at step 450 until the subsequent periodic verifications. If the integrity of the IHS and/or secured workspace cannot be confirmed by the remote attestation service, at step 460, the secured workspace may be collapsed, in which case user's access to secured data and/or applications on the platform may be immediately terminated. If a change in the policies correspond to a revocation of certain access to secured data and/or applications, at step 460 access to the secured data and/or applications on the IHS may also be immediately revoked. Configured in this manner, the secured workspace protects enterprise data within a secured virtual environment that is isolated from the operating system and that is validated on an ongoing basis during the operation of the secured environment. The secured workspace provides protected access to enterprise data, while providing the user with the resources necessary to perform job functions that require access to the enterprise data.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for remotely configuring a secured virtual environment on an Information Handling System (IHS), the method comprising:
receiving one or more reference signatures, wherein each reference signature specifies a reference state for a component of the IHS;
receiving a first request to launch a secured virtual environment on the IHS for a first user;
issuing a second request for calculation of one or more updated signatures, wherein each updated signature specifies an operating state for the respective component of the IHS in operation;
validating an integrity of the IHS based on comparisons of the reference signatures and the updated signatures for the respective components of the IHS;
if the integrity of the IHS is validated, configuring the secured virtual environment for the first user according to one or more policies; and
permitting launching the secured virtual environment on the IHS.

2. The method of claim 1, further comprising:
during operation of the launched secured virtual environment on the IHS, periodically issuing additional requests for calculation of one or more further updated signatures and validating the integrity of the IHS based on comparisons of the reference signatures and the further updated signatures for the respective components of the IHS.

3. The method of claim 1, wherein the first request for calculation of updated signatures is issued to a trusted resource installed on the IHS.

4. The method of claim 3, wherein the trusted resource is an embedded controller installed on the IHS.

5. The method of claim 1, further comprising:
determining a reference signature for the configured virtual environment.

6. The method of claim 5, further comprising:
during operation of the launched virtual environment, periodically determining an updated signature for the launched virtual environment and validating the integrity of the launched virtual environment by comparing the updated signature against the reference signature for the virtual environment.

7. The method of claim 6, further comprising:
collapsing the secured virtual environment on the IHS if the integrity of the virtual environment is not successfully validated.

8. An Information Handling System (IHS), comprising:
one or more processors;
an embedded controller configured to:
calculate one or more reference signatures during booting of the IHS, wherein each reference signature specifies a reference state for a component of the IHS;
transmit the one or more reference signatures to a remote attestation service;
calculate one or more updated signatures, wherein each updated signature specifies an operating state for the respective component of the IHS in operation; and
transmit the one or more updated signatures to the remote attestation service; and
a system memory coupled to the one or more processors, the system memory including program instructions stored thereon that, upon execution by the one or more processors, cause the IHS to:
initialize a trusted agent for hosting a plurality of secured virtual environments on the IHS;
issue, by the trusted agent, a request for a first secured virtual environment on the IHS for a first user;
receive, by the trusted agent, configuration information from the remote attestation service for launching the first secured virtual environment for the first user on the IHS, if the integrity of the IHS during booting has been validated by the remote attestation service based on the one or more reference signatures; and
collapse, by the trusted agent, the first secured virtual environment on the IHS, if the integrity of the IHS in operation cannot be validated by the remote attestation service based on the one or more updated signatures.

9. The IHS of claim 8, wherein the integrity of the IHS in operation is validated by the remote attestation service based on comparisons of the reference signatures and the updated signatures for the respective components of the IHS.

10. The IHS of claim 9, wherein the integrity of the IHS in operation is periodically validated by the remote attestation service.

11. The IHS of claim 8, wherein the trusted resource calculates the one or more updated signatures based on a request issued by the remote attestation service.

12. The IHS of claim 8, wherein the embedded controller is installed on a motherboard of the IHS.

13. The IHS of claim 8, wherein the configuration information received from the remote attestation service comprises a first software package utilized by the trusted agent to launch the first secured virtual environment.

14. The IHS of claim 13, wherein the configuration information received from the remote attestation service comprises a second software package utilized by the trusted agent to launch a second secured virtual environment that is hosted by the IHS concurrently with the first secured virtual environment.

15. A system comprising:
an Information Handling System (IHS) configured to:
calculate one or more reference signatures, wherein each reference signature specifies a reference state for a component of the IHS during booting;
transmit the one or more reference signatures to a remote attestation service;
calculate one or more updated signatures, wherein each updated signature specifies an operating state for the respective component of the IHS in operation;
transmit the one or more updated signatures to the remote attestation service;
host a plurality of secured virtual environments;
issue a request for a first secured virtual environment on the IHS for a first user; and
receive configuration information from the remote attestation service for launching the first secured virtual environment for the first user on the IHS;
one or more IHSs implementing the remote attestation service configured to:
validate an integrity of the IHS during booting based on the one or more reference signatures;
transmit the configuration information to the IHS, if the integrity of the IHS during booting is validated; and periodically validate the integrity of the IHS in operation based on comparisons of the reference signatures and the updated signatures for the respective components of the IHS.

16. The system of claim 15, wherein the configuration information transmitted by the remote attestation agent comprises a first software package utilized by the IHS to launch the first secured virtual environment.

17. The system of claim 16, wherein the configuration information transmitted by the remote attestation service comprises a second software package utilized by the IHS to launch a second secured virtual environment that is hosted by the IHS concurrently with the first secured virtual environment.

18. The system of claim 15, wherein the remote attestation service is further configured to issue a command to the IHS to collapse the first virtual environment if the integrity of the IHS in operation is not successfully validated.

19. The system of claim 15, wherein the remote attestation service is further configured to determine a reference signature for the first secured virtual environment and further configured to periodically request the IHS to calculate an updated signature for the first secured virtual environment in operation.

20. The system of claim 19, wherein the remote attestation service is further configured to periodically validate the first secured virtual environment based on the reference signature for the first secured virtual environment and the updated signature calculated by the IHS.

* * * * *